April 30, 1935.  J. R. DUNHAM  1,999,320
CENTERLESS GRINDER
Filed March 18, 1932    5 Sheets-Sheet 1

Inventor
John R. Dunham.
By Albert R. Dieterich
Attorney

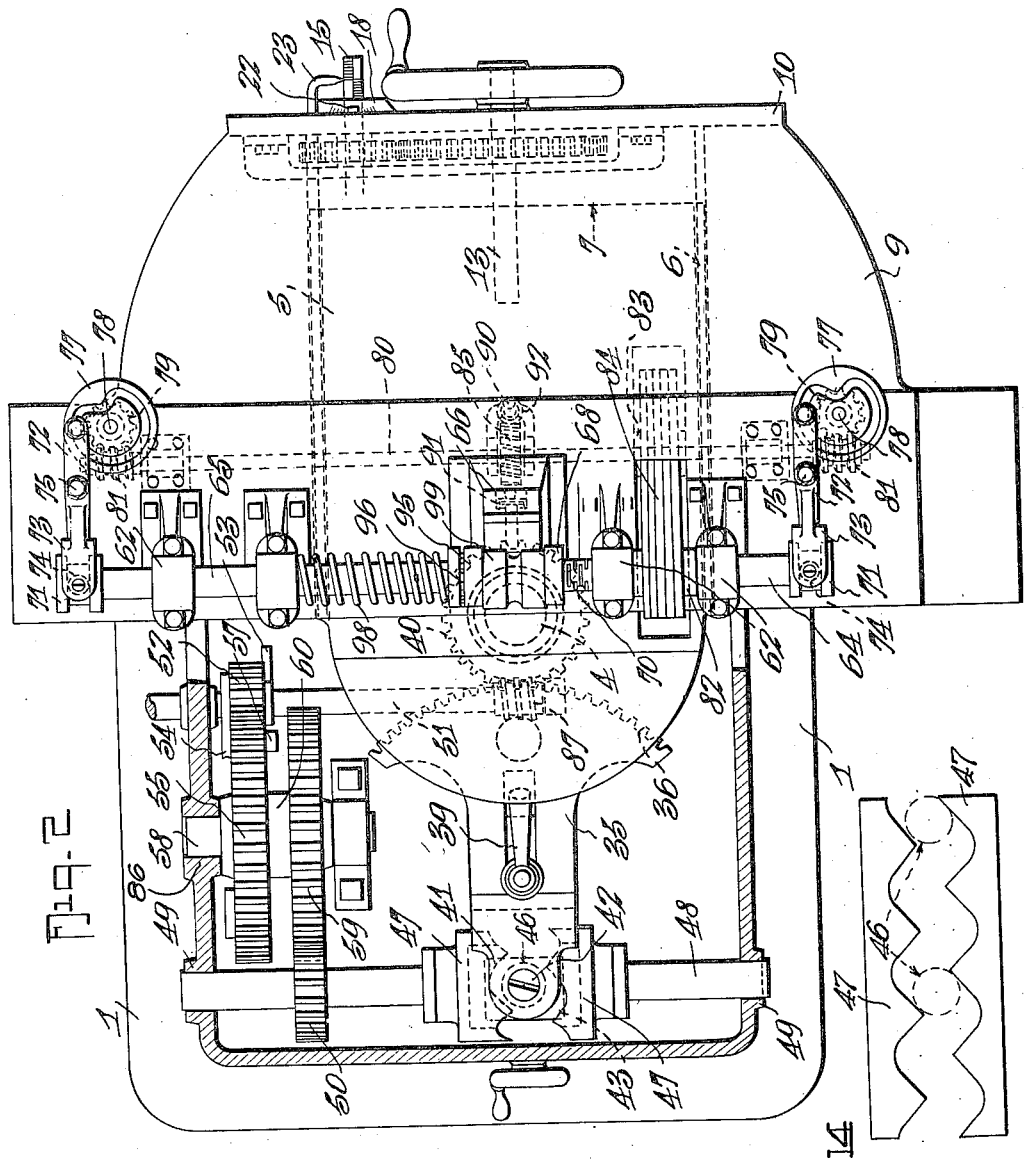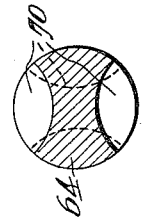

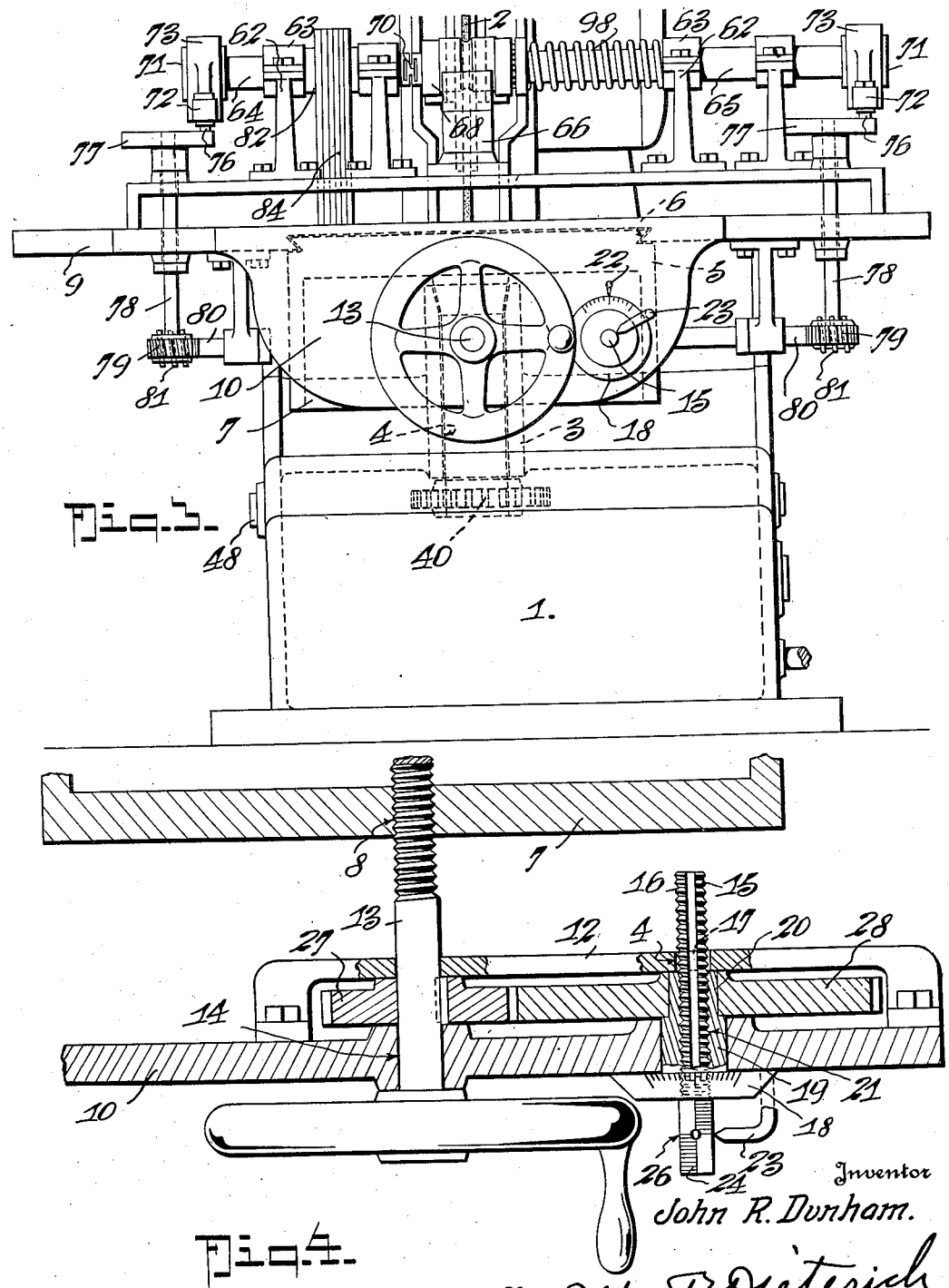

April 30, 1935.  J. R. DUNHAM  1,999,320
CENTERLESS GRINDER
Filed March 18, 1932  5 Sheets-Sheet 4

Inventor
John R. Dunham.
By Albert V. Dietrich
Attorney

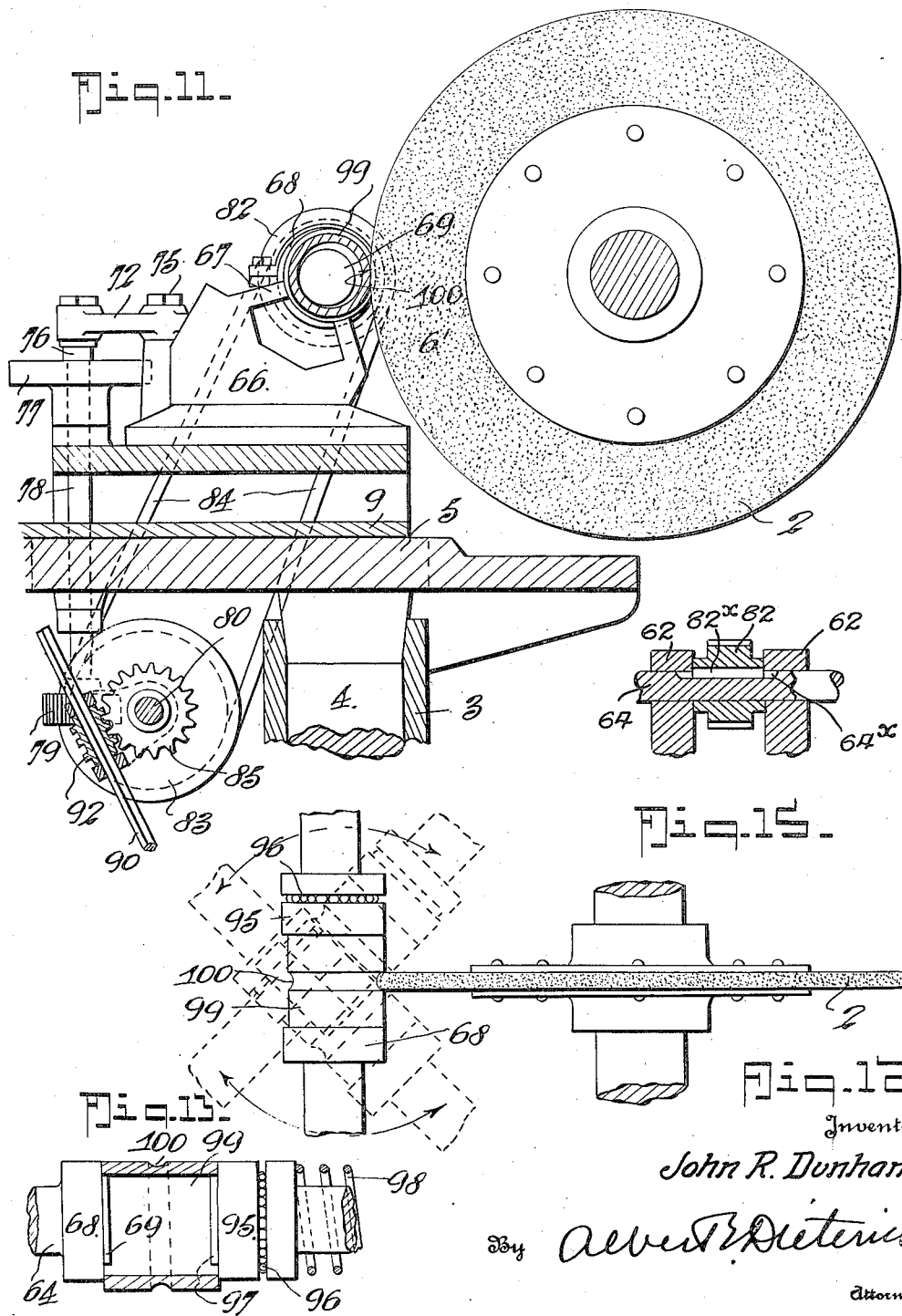

Patented Apr. 30, 1935

1,999,320

UNITED STATES PATENT OFFICE 1,999,320

CENTERLESS GRINDER

John Ryer Dunham, Highland Park, N. J.

Application March 13, 1932, Serial No. 599,782

34 Claims. (Cl. 51—97)

My invention relates to certain new and useful improvements in grinding machines of the type commonly known as centerless grinders. These are machines for grinding bodies in which the grinding wheel serves solely for grinding purposes, the work resting on a saddle-like work rest and rotated by means of a regulating wheel.

My invention has for an object to provide a grinder in which the work is not only not carried upon centers but is not driven by the usual regulating wheel; in my invention the work is driven from the end by a pair of driving spindles whose axes are offset from the center of the work.

Further, it is an object to provide a grinder of the centerless type wherein the work is held more steady and more rigid and also held back in the work rest better than in the centerless grinders now in use.

Further, the invention has for an object to provide means whereby the work drive is made to run considerably slower than the grinding wheel and provision is made for regulating the speed at which the work is run in relation to the grinding wheel.

Further it is an object to provide means whereby it is possible to use a very thin grinding wheel in a centerless grinder. (Other grinding machines which have been used for the work for which my invention has especially been devised,— mostly ball bearing races—and which use thin grinding wheels, always employ a mandrel or a center or both, thus slowing up the production; such machines also have other bad features such as worn centers and mandrels running out of true, thereby causing annoyance and trouble.)

The present centerless grinders with regulating wheels offer little or no resistance to narrow-faced grinding wheels. My invention therefore has for a further object to overcome the objectionable features just noted and this I do by the use of the offset driving spindles.

A further object is to provide means to give an oscillating movement to the work which will generate a radius, both convex and concave, as desired, and to provide means whereby the amplitude of the oscillations may be varied at will, and means whereby the number of oscillations per piece of work found necessary to remove a given amount of stock from the work being ground, may be selectively established and the oscillations may be stopped to bring the work holder to rest for a short period to allow the work to be fed into the machine and then proceed to grind the work; the number of oscillations are secured by the well known change gear method.

A further object is to provide offset work driving spindles which engage the work at its ends and apply the required holding force by frictional contact instead of by the use of centers and so to operate the spindles that the work will be taken out of and put into the work rest by the end movement of the spindles, and to provide means to stop rotation of the work as the work is about to be removed from the work rest.

Further, it is an object to provide a carriage slide on which the driving spindles and work rest are located which has provisions for micrometer adjustment in order to locate the center of the radius which the wheel is to grind so as to grind either convex or concave surfaces at will.

Another object is to provide a flexible driven offset spindle so as to take care of slight variations in grinding the ends of the work before it is put in the grinder to grind the ball race.

Further, it is an object to provide a centerless grinder in which the work is visible while grinding operations are being carried out.

Further, it is an object to provide the driving spindles with safety shoulders to prevent the work from dropping out or releasing in case the holding pressure of the spindles on the work fails.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 2 is a horizontal section and part plan on the line 2—2 of Figure 1.

Figure 3 is an end elevation of my invention and so much of the centerless grinder being shown as is necessary.

Figure 4 is an enlarged detail section of the screw feed means and micrometer adjustment means.

Figure 6 is an enlarged detail cross section of the spindle showing the slitted arrangement thereof.

Figure 7 is a detail plan of the part of the spindle containing the slits.

Figure 11 is an enlarged detail view illustrating how the axis of the work is offset from the axis of the spindles.

Figure 12 is a somewhat diagrammatic plan view showing in dotted lines the movement of the work in relation to the grinder wheel.

Figure 13 is an enlarged detail view illustrating the use of the safety shoulders on the end of the spindles.

Figure 14 is a development of the cams 47.

Figure 15 is a detail section hereinafter referred to.

Figure 1:
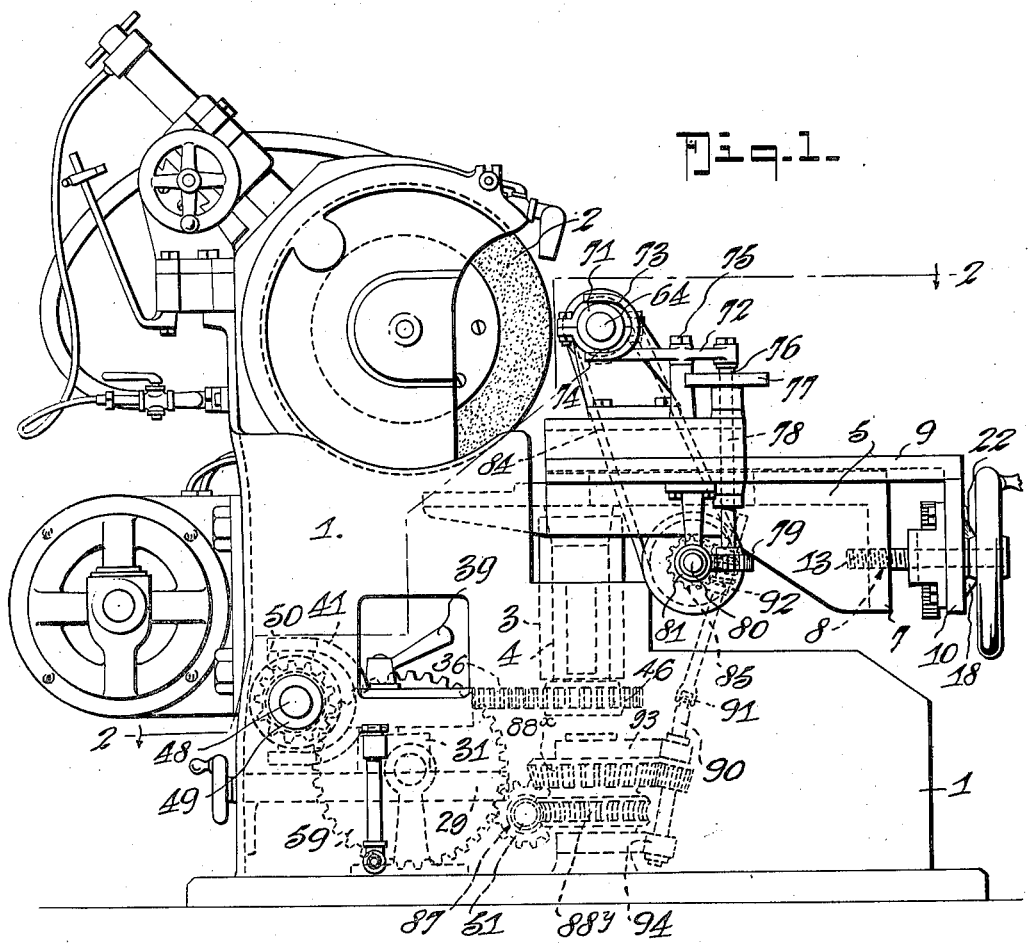
Figure 1 is a front elevation of a centerless grinder with my invention installed thereon.
Figure 5:
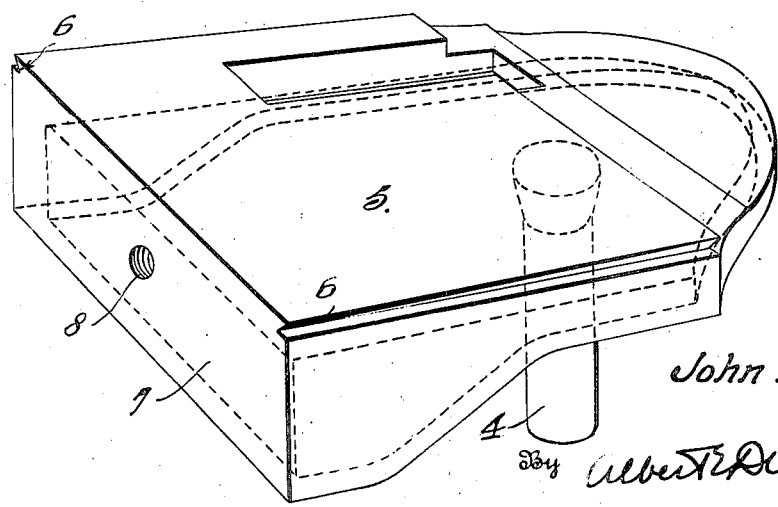
Figure 5 is a perspective view of the oscillatable table.
Figure 8:
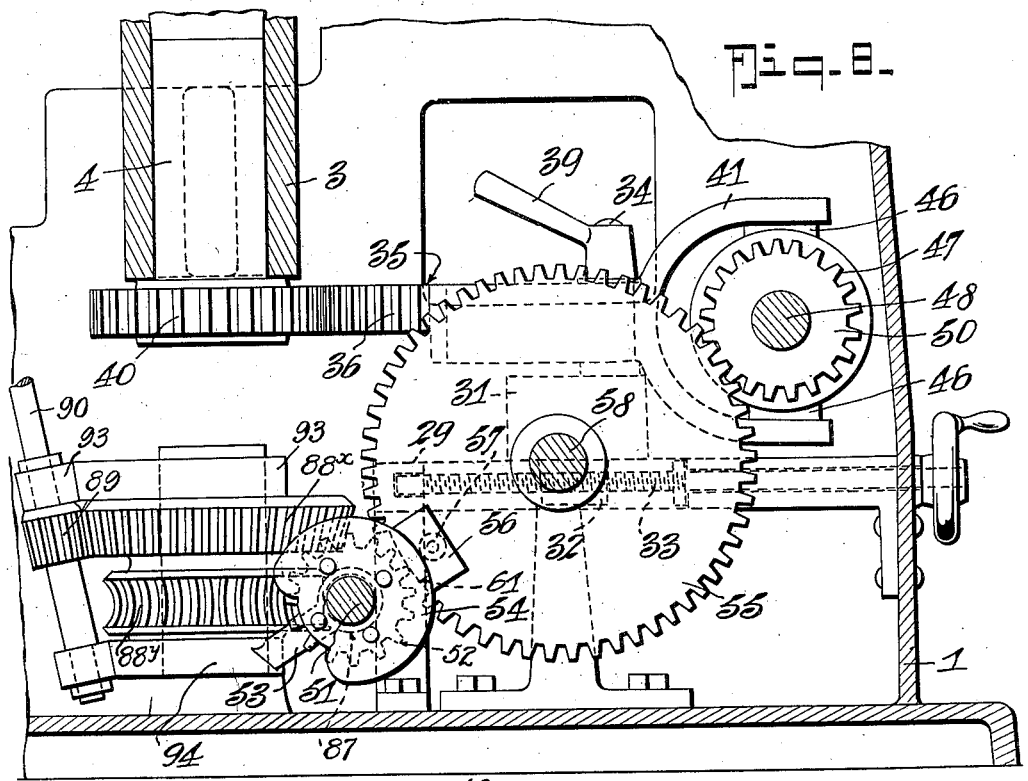
Figure 8 is an enlarged detail view of a portion of the driving mechanism and particularly the Geneva type gear as used in my invention.
Figures 9, 10:
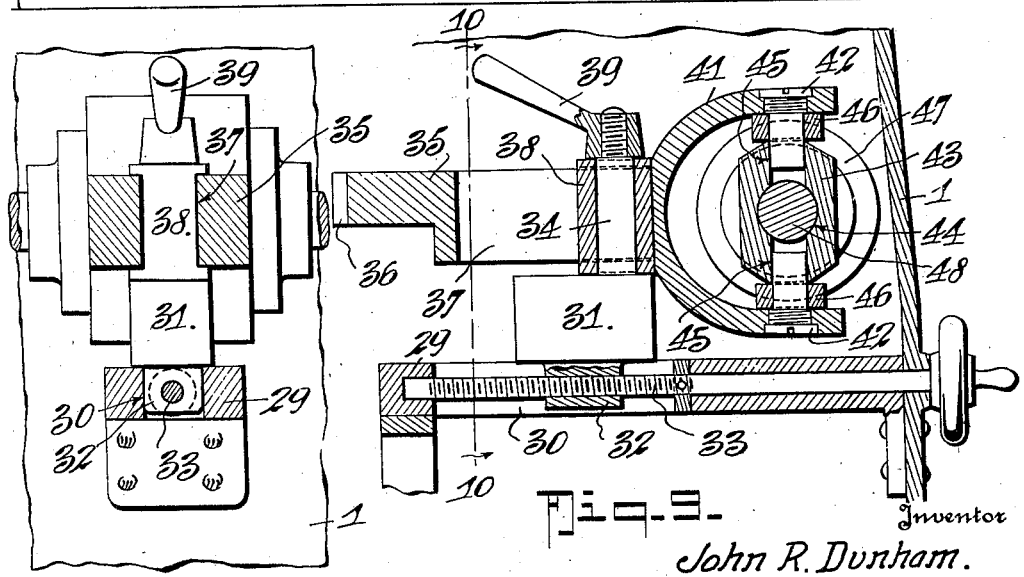
Figure 9 is an enlarged detail section through the oscillating arm and gear segment, and illustrating the pivot adjusting means of said oscillating arm.
Figure 10 is a vertical cross section on the line 10—10 of Figure 9.

In the drawings in which like numerals of reference indicate like parts in all of the figures, I represents the base or frame of the machine on which is mounted in any approved fashion the rotatable grinding wheel 2. This wheel is driven in any of the ways known in the art.

Mounted in a suitable bearing 3, which is located on the base I, is an oscillatable shaft 4 that carries a table 5 having slideways 6 and an apron 7, the latter having a threaded hole 8 to receive the cross feed screw 13.

A slide 9 is provided which has guideways 11 to fit the ways 6 so that the slide 9 may be adjusted along the table 5. The slide 9 also has an apron 10 having a non-threaded hole 14 for a non-threaded portion of the screw 13. The screw is rotatably held in the hole 14 of the apron 10 and in the guide bracket 12 which is secured to the inner face of the apron 10. The bracket 12 has a smooth bore hole 4 for the passage of the micrometer screw 15, which screw is free to move longitudinally in and out in the hole but is held against turning by a feather or key 17 engaging in a key groove 16 of the screw.

Turning freely in a bearing hole in the apron 10 is a dial sleeve 19 which carries a dial plate 18 on its outer end and which has a reduced inner end 20 on which is fastened, in any approved manner, a gear 28 that meshes with a pinion 27 which is secured to the cross feed screw 13. The sleeve 19 is bored and threaded as at 21 to fit the screw 15 whereby turning of the sleeve will advance and retract the screw.

A fixed dial-pointer 22 cooperates with the graduated dial 18 while a fixed screw-pointer 23 cooperates with two sets of graduations on the outer end of the screw 15. These sets start at a common zero mark 26; one set 24 reads outwardly for concave grinding and the other set reads inwardly for convex grinding.

On a suitable part 29 of the base of the machine, which part has slideways 30, is mounted a fulcrum-carrying slide 31 having a base plate 32 slidable in the ways 30 by means of an adjusting screw 33. The member 31 carries a pivot stud 34 on which is mounted the sliding block 38 that works in the slot 37 of the oscillating arm and gear segment 35 whose teeth 36 mesh with a gear 40 on the shaft 4. The block 38 is held on the stud 34 by means of a lock nut 39. The arm 35 has a fork 41 carrying cam-rolls 46 on the studs 42 which lie in the holes 45, and a supporting block 43 that has an opening 44 for the cam shaft 48. At each side of the block 43 the shaft 48 carries a cam 47 and between the camming faces of which cams the rolls 46 lie.

The adjustable fulcrum 31—34 is provided so that when it is desired to change the number of oscillations, segments 36 and gears 40 having different gear ratios may be used (i. e., by employing the well-known change gear method). The fulcrum stud 34 is always adjusted to the center of curvature or radius of the toothed segment 35.

The cam shaft 48 is journalled in suitably located bearings 49 and is intermittently rotated through a mutilated or Geneva type gearing driven by any suitable continuously rotating power shaft of the machine, as for instance the shaft 51.

The driving mechanism for the cam shaft 48 includes a driven gear 50 on the shaft 48, which gear is actuated by the intermediate gear 59 on the sleeve 60. The sleeve 60 also carries the mutilated gear 55 that is driven by the driving gear 52. The gear 52 carries a knock-in lever 53 to cooperate with a starting roll 57 on the gear 55. The gear 52 carries a locking plate 54 to cooperate with a locking seat 56 on the gear 55 for purposes presently understood. The sleeve 60 is journalled on a suitable shaft 58 suitably mounted in bearings 86 on the base of the machine.

The mutilated part of the gear 55 is indicated at 61.

Suitably located on and fastened to the slide 9 are bearing brackets 62 which carry bearings 63 for the front (left) and rear (right) driving spindles 64 and 65 respectively. Between the adjacent ends of the spindles the work rest 66 is mounted on the slide. The work rest has suitable work contact fingers 67 as shown.

The spindles 64 and 65 constitute an important feature of my invention. The front (left) spindle 64 has a driving head 68 having a safety shoulder 69 to project into the work 99 while an end of the work engages the head 68. The spindle 64 is provided with a series of slits 70 located at 90 degrees apart and sufficient in number to render the shaft somewhat flexible so that its head 68 may accommodate itself to any irregularities in the grinding of the ends of the work piece 99.

The spindle 65 also has a driving head 95 provided with a safety shoulder 97 and this head carries a ball or other suitable thrust bearing 96 as shown.

Each spindle has a shifter 71 pinned or otherwise secured to it for the rolls 74 of the forks 73 of the spindle shifting levers 72. By moving the forks the spindles may be shifted along their axes to receive and discharge the work. One of the spindles is shifted to move faster as soon as the work has been ground and is about to be discharged. This will be more clearly understood later.

The levers 72 are fulcrumed at 75 and have cam-rolls 76 that engage in the grooves of the cams 77 which are mounted on the cam shafts 78. These shafts are driven in any suitable way as for instance they may be provided with worm gears 79, driven by worms 81 on a cam-driving shaft 80, the latter having a worm gear 85 to mesh with a worm 92 that is keyed to but is slidable on the upper end of an articulated shaft 90. The members of this shaft are connected by a universal joint 91 in order to allow the shaft 80 to be moved toward and from the axis of the shaft 4 for purposes presently understood. The shaft 90 is mounted in suitable bearings on the slide 9.

The shaft 90 is driven through a gear 89 that meshes with a portion 88ˣ of a gear 88ˣ—88ʸ which is loosely mounted coaxially with the shaft 4. Suitable strap bearing saddles 93 and 94 are provided to hold the shaft 90 in place with its gears in mesh with its cooperating gears. The gear may be driven by a worm 87 on the power shaft 51 which worm meshes with another portion 88ʸ of the gear.

At least one spindle 64 or 65 is driven from the shaft 90 by a silent chain 84 and sprocket 83—82 which constitute the drive mechanism. One of the spindles is held to apply end pressure to the work in cooperation with the other spindle by means of a suitably tensioned spring 98 in order to hold the ends of the work 99 with frictional engagement.

The pulley 82 is of course so mounted on the shaft 64 that while it will turn the shaft it will, nevertheless, permit the shaft to have a limited longitudinal movement in the pulley; this may be accomplished by the old, well-known key (82ˣ) and groove (64ˣ) connection illustrated in Figure 15.

The axes of the spindles are coincident with each other but are offset from the axis of the work 99 (see Figure 11) in order that the rotation of the spindles will hold the work in contact with the fingers of the work rest at all times while the grinding wheel is grinding the surface 100 of the work.

When it is desired to grind a concave ball race 100 in a bearing sleeve 99, the slide 9 is adjusted to position the center of curvature of the ball race in vertical alignment with the center of curvature of the grinding face of the grinding wheel, the work being fed to the grinding wheel by means of the cross feed screw 13.

When it is desired to grind a convex surface the position of the slide 9 is adjusted in accordance with the convex grinding scale 25 of the micrometer screw 15.

Assume that the proper adjustment of the slide has been made and a piece of work 99 is in position for grinding. The gear ratio 50—59 having been determined for the particular piece of work in hand and the fulcrum 34 having been adjusted to give the proper amplitude of the oscillations to the arm 35 and power being turned on, the shaft 51 will impart a predetermined number of oscillations to the arm 35 and then bring it to rest in its normal or mid-position and by reason of the mutilated portion 61 of the mutilated gear 55 hold the oscillating mechanism steady during one revolution of the shaft 51. During this period the cams 77 come into operation to move the spindles 64—65 backwardly, i. e., from left to right in Figure 3 to carry the finished piece of work 99 to the right and discharge the finished piece of work from between the spindle heads, it being understood that the cam tracks of the cams 77 are so designed that as the spindles begin to move toward the discharging position the spindles 65 will move somewhat more rapidly than the spindles 64 so that by the time the spindles reach the limit of their discharge strokes the heads of the spindles will have become separated a distance sufficient to free the work 99 and let it drop.

The instant the spindles 64 and 65 begin to move from the position where they hold the work and turn it for grinding, toward the discharge position, the advancing movement of the spindle 65 will release the frictional contact of the spindles on the work piece 99 so that rotation of the spindles will no longer effect rotation of the work piece and thus it may be slid from the work holder fingers without rotation thereon.

When, however, the spindle heads are engaging the ends of the work piece during the grinding act, sufficient frictional pressure is applied to cause the work to be rotated by the rotation of the spindles and inasmuch as the center or axial line of the spindles is offset from the center or axial line of the work piece, the rotation of the spindles is such as to tend to press the work down onto the work holding fingers and thereby keep the work always in contact with the same.

By the use of my machine it is possible to use a very thin grinding wheel and to cut work without the use of a regulating wheel such as is now commonly employed in centerless grinders, although a regulating wheel may be used in addition to my invention if desired.

By the use of my invention the breaking down of formed face grinding wheels due to the rigidity with which the work has heretofore been held for grinding is, to a very great extent, prevented. The present centerless grinders using a regulating wheel offer no substantial resistance to narrow-faced grinding wheels, whereas the offset driving spindles of my machine do.

It will also be noted that my improved oscillating mechanism which is provided to generate a radius both convex and concave is selective as to the number of oscillations found necessary to remove a given amount of stock from the work being ground and will bring the work to a stop or rest position for a short time to allow the work to be fed into the machine and then proceed to grind the work the predetermined number of oscillations. The number of oscillations may be varied by change gear combinations to suit the work in hand.

After the spindles have discharged the work a new piece can be put into position between the spindle heads and as the spindles are returned to the working position they will grip the new piece and position it properly in the work rest.

The carriage which carries the driving spindles being equipped with a micrometer adjustment enables an accurate control of the center of radius for either convex or concave surfaces generated by the grinding wheel.

As before stated, my method of grinding with offset spindles can be used with the usual regulating wheel now on centerless grinders if desired, the regulating wheel backing up the work to be ground and the reaction of the driving spindles holds the work very rigid during the grinding operation.

My machine may also be used for straight grinding by the through feed method after but very little, if any, alteration.

Due to the manner of holding the work while grinding the race the danger of springing the work in my apparatus is entirely eliminated. This is not the case when chucking the race on the outside as in the machines of the prior art. Furthermore, by the use of my invention for grinding the ball races each operation of grinding is done from the preceding grinding which insures concentricity with each other; in other words when grinding the ball race one grinds from the ground surface which preceded this operation.

From the foregoing description, taken in connection with the accompanying drawings, it is

What I claim is:

1. In a centerless grinder, a grinding wheel and means to rotate the same, a work rest, a pair of work turning spindles between which the work is held by end engagement therewith, means for mounting said spindles with their axes continuously offset from that of the finished work, and means to drive said spindles to turn the work.

2. In a centerless grinder, a grinding wheel and means to rotate the same, a work rest, a pair of work turning spindles between which the work is held by end engagement therewith, means for mounting said spindles with their axes continuously offset from that of the finished work, and means to drive said spindles to turn the work, means to move the work rest and spindles with the work toward and from the grinding wheel.

3. In a centerless grinder, a work rest, and spindles between which the work is held, a slide on which said rest and spindles are mounted as a unit, a support on which said slide is mounted, a primary feed screw carried by said slide and engaged with said support, a micrometer adjustment screw also mounted on said slide, said micrometer screw having graduations in two sets from a zero line for concave and convex grinding operations respectively, a fixed pointer associated with said graduations, a sleeve threaded on said micrometer adjustment screw and having a graduated dial for fine adjustment, a fixed pointer cooperating with said dial, and gears connecting said primary feed screw with said sleeve.

4. In a centerless grinder, a grinding wheel and means to rotate the same, a work rest, a pair of work turning spindles between which the work is held by end engagement therewith, means for mounting said spindles with their axes offset from that of the work, and means to drive said spindles to turn the work, and means to oscillate said work rest and said spindles with the work on a vertical axis for the purposes described.

5. In a centerless grinder, a grinding wheel and means to rotate the same, a work rest, a pair of work turning spindles between which the work is held by end engagement therewith, means for mounting said spindles with their axes offset from that of the work, means to drive said spindles to turn the work, means to move the work rest and spindles with the work toward and from the grinding wheel, and means to oscillate said work rest and said spindles with the work on a vertical axis for the purposes described.

6. In a centerless grinder, a grinding wheel and means to rotate the same, a work rest, means to move the work rest with the work toward and from the grinding wheel, said last named means including a cross feed screw and a micrometer adjusting screw, a dial cooperating with said micrometer adjusting screw, gear connections between said screw, and means to oscillate said work rest and said spindles with the work on a vertical axis for the purposes described.

7. In a centerless grinder, a work rest, a slide on which said rest is mounted, a support on which said slide is mounted, a primary feed screw carried by said slide and engaged with said support, a micrometer adjustment screw also mounted on said slide, said micrometer screw having graduations in two sets from a zero line for concave and convex grinding operations respectively, a fixed pointer associated with said graduations, a sleeve threaded on said micrometer adjustment screw and having a graduated dial for fine adjustment, a fixed pointer cooperating with said dial, gears connecting said primary feed screw with said sleeve, and means to oscillate said work rest and said spindles with the work on a vertical axis for the purposes described.

8. In a centerless grinder, a work rest, a slide on which said rest is mounted, a support on which said slide is mounted, a primary feed screw carried by said slide and engaged with said support, a micrometer adjustment screw also mounted on said slide, said micrometer screw having graduations in two sets from a zero line for concave and convex grinding operations respectively, a fixed pointer associated with said graduations, a sleeve threaded on said micrometer adjustment screw and having a graduated dial for fine adjustment, a fixed pointer cooperating with said dial, and gears connecting said primary feed screw with said sleeve, means to impart a predetermined number of oscillations to said slide for each piece of work.

9. In a centerless grinder, a work rest, a slide on which said rest is mounted, a support on which said slide is mounted, a primary feed screw carried by said slide and engaged with said support, a micrometer adjustment screw also mounted on said slide, said micrometer screw having graduations in two sets from a zero line for concave and convex grinding operations respectively, a fixed pointer associated with said graduations, a sleeve threaded on said micrometer adjustment screw and having a graduated dial for fine adjustment, a fixed pointer cooperating with said dial, gears connecting said primary feed screw with said sleeve, and means to oscillate said slide on a vertical axis and including mechanism to bring said slide to rest and hold it against oscillation while placing and removing a piece of work in and from the machine.

10. In a centerless grinder, the combination with a grinding wheel, of a slide, a work rest and work holding spindles carried by said slide, means for advancing and retracting said slide to bring the work to and remove it from the grinding wheel, and means to impart a predetermined number of oscillations to said slide to oscillate the work with respect to the grinding wheel, and means to stop the oscillations with the work at right angles to the plane of the grinding wheel during a definite time interval between each number of oscillations.

11. In a centerless grinder wherein is provided a rotating grinding wheel, a work support, a slide thereon, a work rest and work driving spindles mounted on said slide, means to move the slide toward and from the wheel, means to oscillate the slide, and means to vary the amplitude of the oscillations.

12. In a centerless grinder wherein is provided a rotating grinding wheel, a work support, a slide thereon, a work rest and work driving spindles mounted on said slide, means to move the slide toward and from the wheel, means to oscillate the slide a predetermined number of oscillations and then bring it to rest for a definite time interval after each predetermined number of oscillations, and means to vary the amplitude of the oscillations.

13. In a centerless grinder wherein is provided a rotatable grinding wheel relatively fixed as to location, a work rest, and a pair of spindles for holding the work between them by end engagement, a slide on which said spindles and work rest are mounted, means for feeding the slide toward and from the wheel, said spindles including shoulder portions for engaging in the end of the work for the purposes described.

14. In a centerless grinder wherein is provided a rotatable grinding wheel relatively fixed as to location, a work rest, and a pair of spindles for holding the work between them by end engagement, a slide on which said spindles and work rest are mounted, means for feeding the slide toward and from the wheel, said spindles including shoulder portions for engaging in the end of the work, and means for moving the spindles longitudinally to bring work into position and remove it therefrom.

15. In a centerless grinder wherein is provided a rotatable grinding wheel relatively fixed as to location, a work rest, and a pair of spindles for holding the work between them by end engagement, a slide on which said spindles and work rest are mounted, means for feeding the slide toward and from the wheel, said spindles including shoulder portions for engaging in the end of the work, and means for moving the spindles longitudinally to bring work into position and remove it therefrom and including means whereby one spindle is moved endwise for discharging purposes faster than the other to relieve the engaging pressure on the work and stop its rotation during the discharging act.

16. In a centerless grinder wherein is provided a rotatable grinding wheel of relatively fixed location, and a work rest associated with the wheel, means for holding the work on the rest and imparting rotation thereto, said means comprising a pair of aligned spindles continuously offset from the center line of the finished work, and means for rotating said spindles.

17. In a centerless grinder wherein is provided a rotatable grinding wheel of relatively fixed location, and a work rest associated with the wheel, means for holding the work on the rest and imparting rotation thereto, said means comprising a pair of aligned spindles continuously offset from the center line of the finished work, means for rotating said spindles, and means for holding said spindles in endwise engagement with the work.

18. In a centerless grinder wherein is provided a rotatable grinding wheel of relatively fixed location, and a work rest associated with the wheel, means for holding the work on the rest and imparting rotation thereto, said means comprising a pair of aligned spindles continuously offset from the center line of the finished work, means for rotating said spindles, and means for holding said spindles in endwise engagement with the work, one of said spindles having a flexible portion to adapt itself to inaccuracies in the end of the work.

19. In a centerless grinder wherein is provided a rotatable grinding wheel of relatively fixed location, and a work rest associated with the wheel, means for holding the work on the rest and imparting rotation thereto, said means comprising a pair of aligned spindles continuously offset from the center line of the finished work, means for rotating said spindles, and means for holding said spindles in endwise engagement with the work, means for moving said spindles in the directions of their axes to place and remove the work, said means including provisions for relieving the holding pressure on the article to stop its rotation during the removal period.

20. In a centerless grinder, the combination with a rotatable grinding wheel and a work rest, of rotatable turning spindles having flat ends to engage the ends of the work by contact only, means for holding the spindle ends in contact with the work, and safety shoulders on the spindle ends normally out of contact with the work for the purposes specified.

21. In a centerless grinder, the combination with a rotatable grinding wheel and a work rest, of rotatable turning spindles having flat ends to engage the ends of the work by contact only, means for holding the spindle ends in contact with the work, safety shoulders on the spindle ends normally out of contact with the work, and means to move the spindles endwise to bring the work into place on and remove the same from the work rest, said last named means including instrumentalities for moving the leading spindle during discharge operation at a faster rate than that of the following spindle.

22. In a centerless grinder, the combination with a rotatable grinding wheel and a work rest, of rotatable turning spindles having flat ends to engage the ends of the work by contact only, means for holding the spindle ends in contact with the work, safety shoulders on the spindle ends normally out of contact with the work, the axes of said spindles being offset from the axis of the work when on the work rest.

23. In a centerless grinder, the combination with a rotatable grinding wheel and a work rest, of rotatable turning spindles having flat ends to engage the ends of the work by contact only, means for holding the spindle ends in contact with the work, safety shoulders on the spindle ends normally out of contact with the work, and means to move the spindles endwise to bring the work into place on and remove the same from the work rest, said last named means including instrumentalities for moving the leading spindle during discharge operation at a faster rate than that of the following spindle, the axes of said spindles being offset from the axis of the work when on the work rest.

24. In a centerless grinder wherein is provided a rotating grinding wheel, a work support, a slide thereon, a work rest and work driving spindles mounted on said slide, means to move the slide toward and from the wheel, means to oscillate the slide, and means to vary the amplitude of the oscillations, said varying means including a cam actuated rocker and a shiftable fulcrum for said rocker.

25. A work rest, a pair of work turning spindles between which the work is held by end engagement therewith, means for mounting the said spindles with their axes continuously offset from that of the finished work, and means to drive said spindles to turn the work.

26. A work rest, a pair of work turning spindles between which the work is held by end engagement therewith, means for mounting the said spindles with their axes continuously offset from that of the finished work, and means to drive said spindles to turn the work, and means to move the work rest and spindles with the work bodily laterally.

27. A work rest, a pair of work turning spindles between which the work is held by end engagement therewith, means for mounting the said spindles with their axes offset from that of the work, means to drive said spindles to turn the work, means to move the work rest and spindles with the work bodily laterally, and means to oscillate said work rest and said spindles with the work on a vertical axis.

28. A work rest for supporting the work throughout the grinding operation, a pair of spindles for holding the work between them by end engagement, a base on which said spindles and work rest are mounted, said spindles including shoulder portions for engaging in the end of the work for the purpose described.

29. A work rest for supporting the work throughout the grinding operation, a pair of spindles for holding the work between them by end engagement, a base on which said spindles and work rest are mounted, said spindles including shoulder portions for engaging in the end of the work, and means for moving the spindles longitudinally to bring work into position and remove it therefrom.

30. A work rest, a pair of spindles for holding the work between them by end engagement, a base on which said spindles and work rest are mounted, said spindles including shoulder portions for engaging in the end of the work, and means for moving the spindles longitudinally to bring work into position and remove it therefrom, and including means whereby one spindle is moved endwise for discharging purposes faster than the other to relieve the engaging pressure on the work and stop its rotation during the discharging act.

31. A work rest, a pair of spindles for holding the work between them by end engagement, a base on which said spindles and work rest are mounted, said spindles including shoulder portions for engaging in the end of the work, and means for moving the spindles longitudinally to bring work into position and remove it therefrom, and including means whereby one spindle is moved endwise for discharging purposes faster than the other to relieve the engaging pressure on the work and stop its rotation during the discharging act, one of said spindles having a flexible portion to adapt itself to inaccuracies in the end of the work.

32. A work rest, rotatable turning spindles having flat ends to engage the ends of the work by contact only, means for holding the spindle ends in contact with the work, safety shoulders on the spindle ends normally out of contact with the work, the axes of said spindles being offset from the axis of the work when on the work rest.

33. A work rest, rotatable turning spindles having flat ends to engage the ends of the work by contact only, means for holding the spindle ends in contact with the work, the axes of said spindles being continuously offset from the axis of the finished work when on the work rest.

34. A work rest, rotatable work turning spindles having flat ends to engage the ends of the work by contact only, means for holding the spindle ends in contact with the work, means to move the spindles endwise to bring the work into place and remove the same from the work rest, said last named means including instrumentalities for moving the leading spindle during discharge operation at a faster rate than that of the following spindle, the axes of said spindles being offset from the axis of the work when on the work rest.

JOHN RYER DUNHAM.